United States Patent [19]
Jones

[11] Patent Number: 5,267,517
[45] Date of Patent: Dec. 7, 1993

[54] MULTI FUNCTION TILLAGE OR PLANTING IMPLEMENT

[75] Inventor: Met L. Jones, Pine Bluff, Ark.

[73] Assignee: Farmers Tractor and Equipment d/b/a Dickey Machine Works, Pine Bluff, Ark.

[21] Appl. No.: 826,379

[22] Filed: Jan. 27, 1992

[51] Int. Cl.$^5$ .................. A01C 5/04; A01B 21/02
[52] U.S. Cl. ................ 111/62; 172/548; 172/540; 172/606; 111/125; 111/927
[58] Field of Search ............ 111/52, 125, 153, 53–55, 111/59, 62, 144, 927; 172/145, 149–151, 172, 177, 540, 548, 644, 558, 16, 17, 606, 195

[56] References Cited

U.S. PATENT DOCUMENTS

| | | | |
|---|---|---|---|
| 2,676,524 | 4/1954 | Baglor | 172/558 |
| 2,859,718 | 11/1958 | Barkley | 111/125 |
| 3,124,202 | 3/1964 | Barkley | 111/62 |
| 3,367,293 | 2/1968 | Cox | 111/144 |
| 4,055,126 | 10/1977 | Brown et al. | 172/540 |
| 4,135,457 | 1/1979 | Willis | 14/927 |
| 4,241,674 | 12/1980 | Mellinger | |
| 4,776,290 | 10/1988 | Ram et al. | 111/89 |

FOREIGN PATENT DOCUMENTS

| | | | |
|---|---|---|---|
| 2420907 | 11/1979 | France | 172/558 |
| 370904 | 5/1973 | U.S.S.R. | 172/177 |
| 1111701 | 9/1984 | U.S.S.R. | 172/172 |
| 1516018 | 10/1989 | U.S.S.R. | 172/145 |

OTHER PUBLICATIONS

Lilliston Rolling Caltivators Owner's Manual, Jul. 1972 Model 2000.
KMC Speed-Wheel Cultivators-Flyer, Oct. 19, 1989.

Primary Examiner—Randolph A. Reese
Assistant Examiner—Spencer Warnick
Attorney, Agent, or Firm—Stephen D. Carver; J. L. Mahurin

[57] ABSTRACT

A planting, and agri-chemical applicating farming implement for multiple tilling functions. The implement can be deployed in multiple gang configurations. Each gang comprises a frame for coupling the implement to a tow vehicle, a blade depending downwardly from the front of the frame for initially contacting, shaping, and leveling a raised row or bed, means for applying agri-chemicals and seed to soil behind the blade, and multiple spider gangs for vigorously mixing and incorporating agri-chemical, seed, and soil. The spider gangs comprise a first gang of rotatable spiders disposed in a row beneath said frame and journaled for rotation about a first adjustable common axis of rotation, and a second gang of rotatable spiders disposed in a row beneath said frame means and journaled for rotation about a second adjustable common axis of rotation. The first and second axes of rotation preferably form equal and opposite acute angles with respect to the implement's longitudinal axis. Preferably the second gang is partially or entirely meshed with said first gang. A roller for compacting and sealing agri-chemical and moisture in the soil trails the apparatus. It is yieldably biased downwardly from the frame behind the spider gangs into soil contact for sealing and compacting the bed.

17 Claims, 4 Drawing Sheets

MULTI FUNCTION TILLAGE OR PLANTING IMPLEMENT

BACKGROUND OF THE INVENTION

The present invention relates broadly to agricultural tilling implements. More specifically it relates to a multi-function tilling implement for leveling, planting, and compacting the soil.

Traditionally, preparing and planting a field has been a multi-step process, involving many passes over a field by a farmer performing such tasks as leveling, plowing, planting, and agri-chemical application. With such a drawn out process the possibility of unforeseen interference by rain or other weather conditions is great. Much time and effort redoing previously performed tasks could be saved if all, or most, of the steps of field preparation and planting could be performed at one time.

The prior art in the area of farm implements points out many devices that can be used to ease the difficulty of each individual step, improved plows and disks for plowing, automatic seed placing machines for planting, and agri-chemical spraying mechanisms. But, few of these implements provide a means for accomplishing more than a couple of tasks at a time.

The many benefits of planting crops in raised beds or rows have long been recognized. These benefits include: accelerated warming of the soil, improved drainage of the plant row area and facilitation of furrow irrigation in the plant row area. Known methods and equipment used for incorporating chemicals into these raised rows have been unsatisfactory in their precision, as well as being time consuming multiple pass processes. These processes also require that agri-chemicals be applied in a broadcast manner rather than in a more efficient band or strip.

The present invention results in not only more efficient use of agri-chemicals, farm equipment, and fuel to operate the equipment; it also provides a means to save time and thereby labor. But, possibly the greatest savings that the present invention provides it to the land itself. Erosion is a concern for not only the conservationist but also for the farmer, for his livelihood comes from the soil. When a bedded field can be leveled, tilled, planted, and the soil treated and sealed all in a single pass, the likelihood of loss to unforeseen weather or to erosion is greatly reduced.

The prior art teaches in Smith U.S. Pat. No. 3,815,684 a minimum tillage tool comprising a "U" shaped shaper with horizontally extending blades and a planter towed behind said shaper. Shoemaker U.S. Pat. No. 4,838,360 teaches a minimum tillage implement employing a shaper for topping rows and a reel for tiling the area of the row. The top shaper is substantially horizontal and forward projecting to prevent dirt from spilling over the top. The reel has a number of blades evenly spaced about a shaft with tabs between the blades to allow it to roll smoothly and not clog. Brown et al U.S. Pat. No. 4,817,732 teaches a spider wheel for a rotary incorporator adapted to be towed in a given direction. Brown et al U.S. Pat. No. 4,646,850 teaches a rotary incorporator and spider wheel therefore, which has two rows of spider wheels each wheel with an individual axis of rotation. The second set of axes set at an acute angle to the first set. Peck U.S. Pat. No. 5,020,604 teaches a dual tillage implement with two rows of spider wheels, each spider also having an individual axis of rotation. Once again the axes of the second row are at an acute angle to the axes of the first row.

None of the above cited patents teach the total combination claimed by the present invention. None of them employ all the elements included in the present invention; a leveling device, a tillage implement, and a compacting implement, with means to apply agri-chemical and/or seeds. Additionally, the present invention provides for two gangs of spiders, each gang mounted on a common axle. Each gang is adjustable in such a way that the common axis of rotation of each gang may be placed at an acute angle to the other gang's common axis of rotation, resulting in a substantial mixing of the soil and the substances applied to it. Furthermore, these adjustments allow the gangs to be intermeshed, providing yet even more active incorporation of the soil, it's component moisture, agri-chemical, and seed dispersed by the implement.

SUMMARY OF THE INVENTION

My tilling implement is adapted to accomplish multiple functions in a single pass. It can be combined in arrays of one or more gangs to treat soil with a minimum of passes.

The implement comprises a rigid frame from which a front-mounted blade downwardly depends for initially leveling a bed. Applicators are deployed rearwardly of the blade for treating the soil. Individual spiders are disposed in rows behind the blade. A separate, trailing roller is mounted to the frame rearward of the spider gangs. Several of the disclosed implements can be attached to a tool bar for concurrent use.

Preferably the frame comprises a forward main frame section and a floating subframe linked to the main frame. The blade is attached to the forward main frame. The blade is generally "V" shaped in plan, having upright sides and a forward projecting tongue. It can be adjusted vertically by the user to vary the attack. The forward main frame provides means to attach the implement to a tool bar using "U" bolts. The floating subframe and the forward main frame are connected by means of a parallel linkage.

A forward applicator generally applies agri-chemicals such as pesticides, herbicides or fertilizer. The rearward applicator can be used to dispense seeds if desired.

The spider gangs are bolted to the subframe sides through slots on both the spider gang struts and subframe sides. These gangs are comprised of axles containing a plurality of individual, rotatable spiders a mounting strut and scrapers generally extending downwardly between the individual spiders toward the field surface. The spider gangs are adjustable forwardly and rearwardly independently at each end to provide a means of creating an acute angle between the forward, and rearward spider gangs. Special mounting slots allow each spider gang to be adjusted angularly and forward and backward relative to the frame. The spiders can thus be fully or partially intermeshed for more vigorous incorporation of the soil, moisture and the substances applied by the applicators.

The roller comprises a ridged rear frame mounted to the floating subframe, a wheel assembly pivotally mounted to the frame and a spring assembly adjustably biasing the wheel assembly downwardly. Following incorporation of the agri-chemicals, moisture and soil, this roller is used to seal the soil to prevent evaporation, activate the chemicals and provide a firm planting surface.

Thus a broad object of this invention is to provide a means to prepare a field for planting with a minimal number of passes.

An object of this invention is to improve the efficiency of agri-chemicals by providing a precise means of double incorporation, instant activation and sealing in a single pass.

A still further object is to reduce the amount of agri-chemicals used by confining the application of these chemicals to a predetermined band width about the planted row.

Another object of this invention is to prepare a field with the least amount of labor possible.

A further object of the present invention is to avoid the use of more farming implements than is absolutely necessary.

Yet another object of the present invention is to conserve expensive agri-chemicals by limiting their application to defined rows.

Additionally an object of this invention is to conserve the soil's component moisture.

A broad object of this multi-purpose farming implement is to provide a means to move easily comply with Environmental Protection Agency standards concerning soil erosion.

An incidental object of this invention is to reduce wear and use of tractors.

Another object of this implement is to reduce soil erosion by limiting tillage to only one strip or band of each row.

An indirect object of this invention is to prevent pollution caused by run-off and evaporation of agri-chemicals by sealing these chemicals in the soil.

A primary object of this invention is to increase the productivity of the soil by thoroughly incorporating agri-chemicals and seeds into the soil.

Another important object is to prevent "balling up" of material between the incorporating spiders of a tilling implement.

Another object is to provide adjustable spiders to accommodate the machine for soils exhibiting soft or hard conditions.

A significant object of the present invention is to prevent loss of soil resulting from wind or water erosion as a result of a field standing between farming operations.

These and other objects and advantages of the present invention, along with features of novelty appurtenant thereto, will appear or become apparent in the course of the following descriptive sections.

BRIEF DESCRIPTION OF THE DRAWINGS

In the following drawings, which form part of the specification and which are to be construed in conjunction therewith, and in which like reference numerals have been employed throughout wherever possible to indicate like parts in the various views.

DETAILED DESCRIPTION

Figure 1:
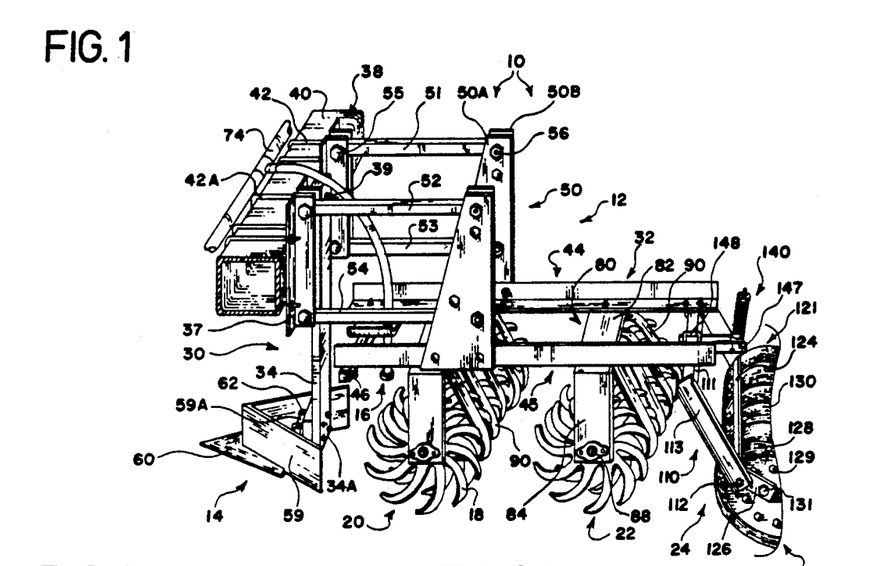
FIG. 1 is a side perspective view illustrating the best mode of my new MULTIFUNCTION TILLAGE OR PLANTING IMPLEMENT.
Figure 2:
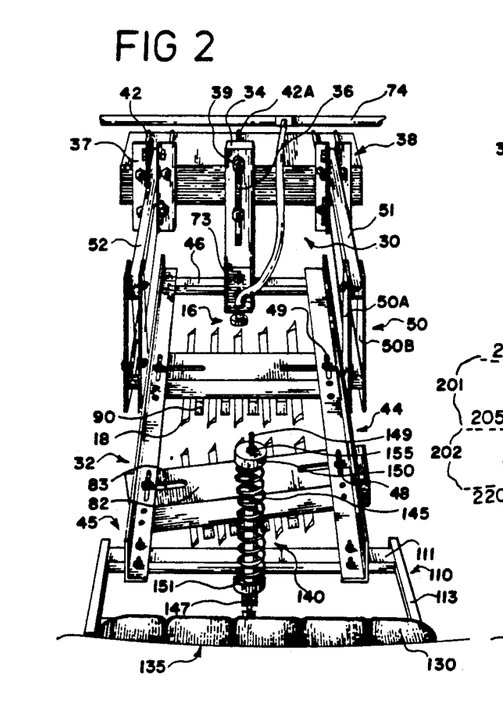
FIG. 2 is a top perspective view illustrating the implement with it's spider gangs at an acute angle to one another.
Figure 2A:
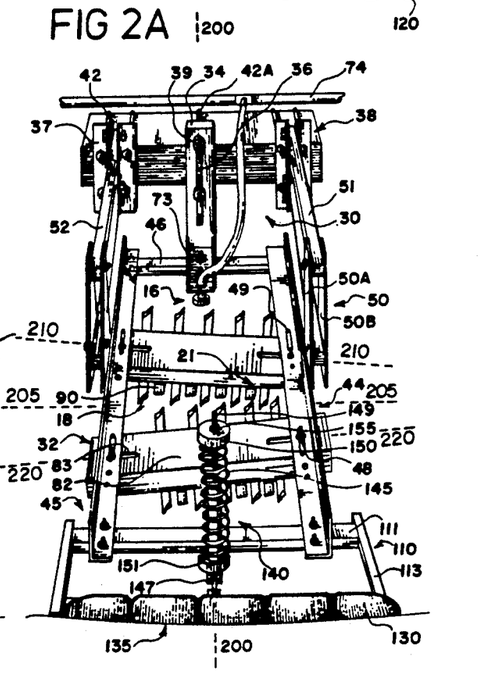
FIG. 2A is a similar perspective view illustrating the spider gangs intermeshed.
Figure 3:
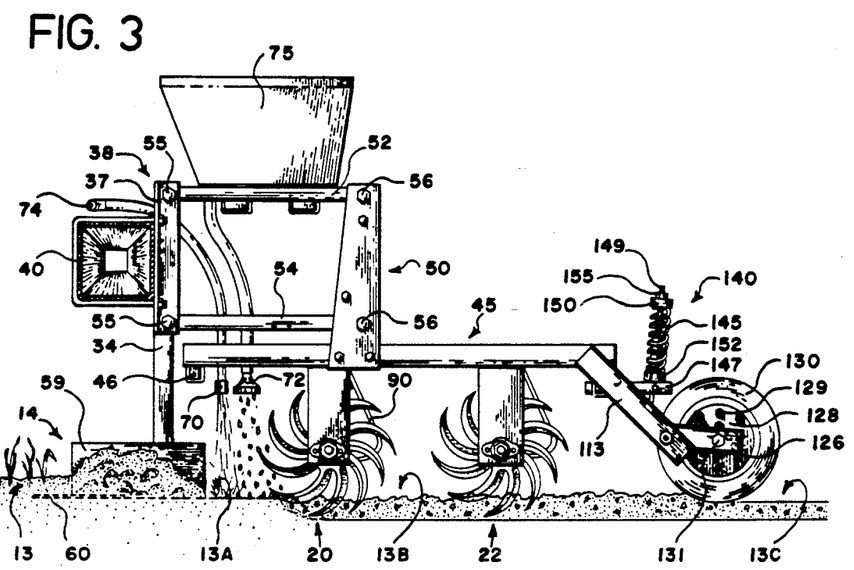
FIG. 3 is a side view of the implement in operation.
Figure 4:
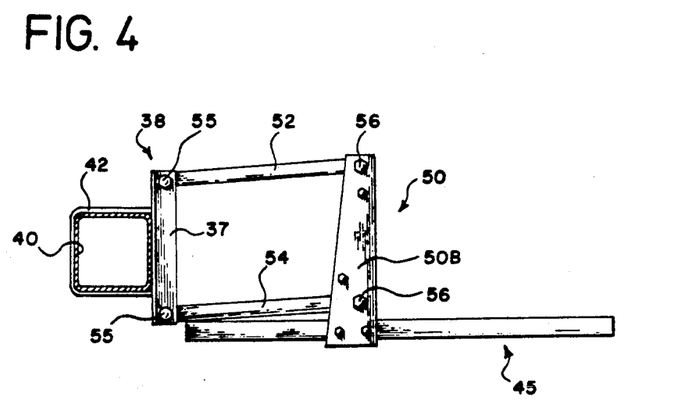
FIG. 4 is a of the parallel linkage between the forward main frame and the subframe side members.
Figure 5:
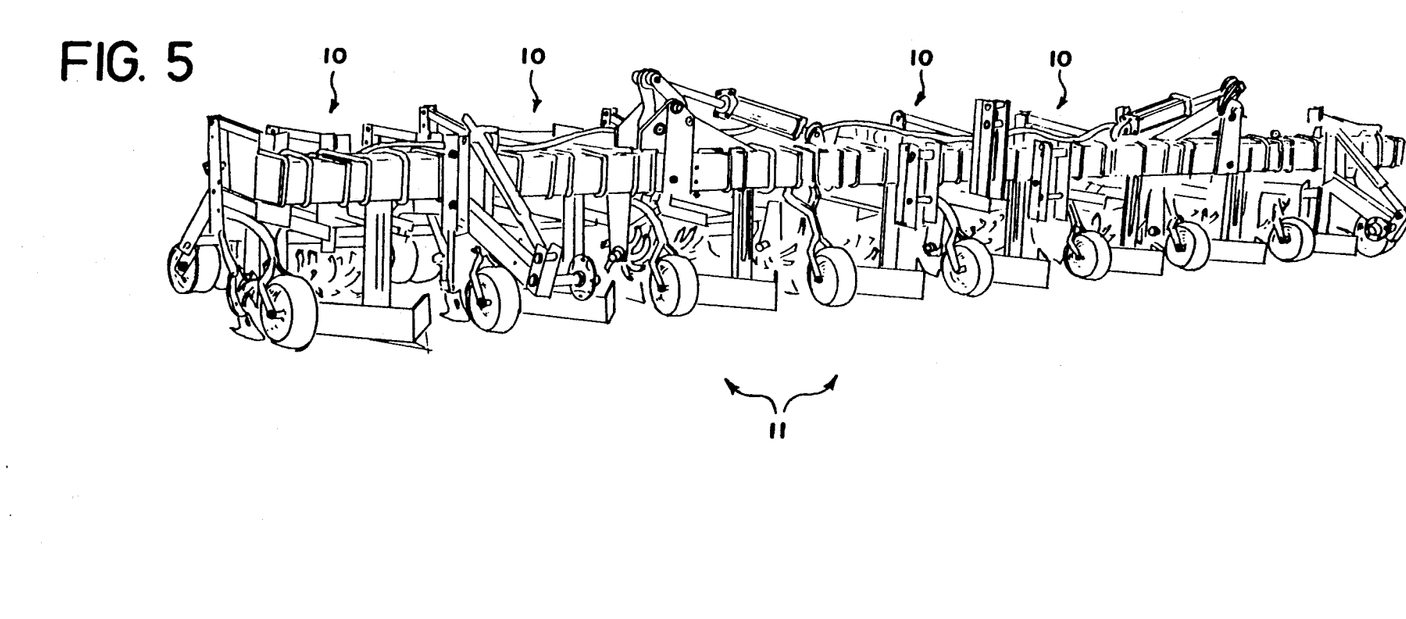
FIG. 5 is a perspective view of a number of the claimed implements coupled to a single tool bar for use in conjunction with one another.
Figure 6:
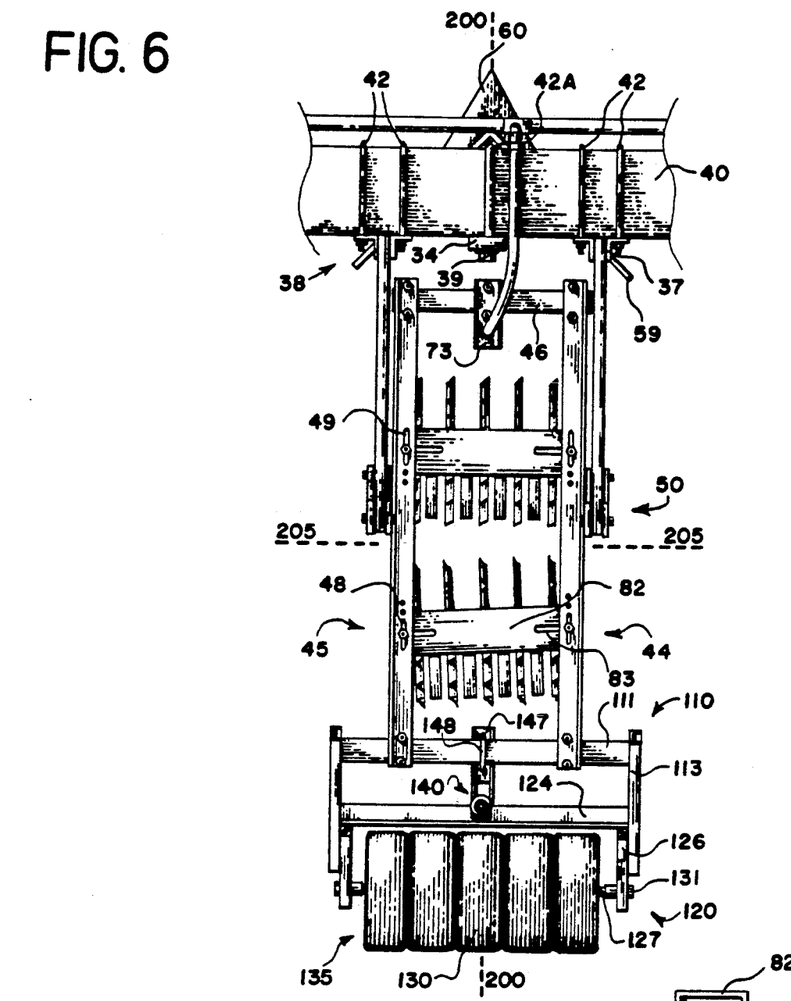
FIG. 6 is a plan view of the implement illustrating the spatial relationship of it's elements.
Figure 7:
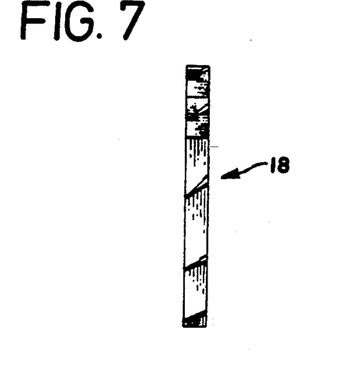
FIG. 7 is a front view of an individual spider.
Figure 8:
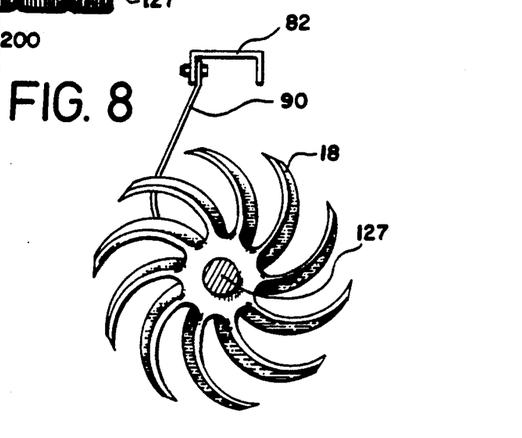
FIG. 8 is a side view of an individual spider showing the position of a typical scraper.

With reference now to the accompanying drawings, the best mode of my multifunction farming implement is broadly designated by the reference numeral 10. As illustrated by FIG. 5, several of the disclosed sections of FIGS. 1-3 for example, can be combined and attached to a single tool bar for concurrent use as dictated by the size of the field and the tractor used. The multi-segment embodiment has been generally designated by the reference numeral 11 (FIG. 5). The invention "attacks" a raised row bed 13 previously formed with a disk harrow or the like. It incorporates agri-chemical and/or seeds that are applied in region 13A in region 13B, and yields a treated, compressed row 13C (FIG. 3).

Referring to FIGS. 1-8, my implement preferably comprises a rigid, supportive frame 12 that front-mounts a rigid, downwardly projecting blade 14. User selected applicator apparatus 16 is deployed rearwardly of blade 14. Spaced apart spider gangs 20 and 22 comprising multiple, rotatable spiders 18 disposed in separate rows are disposed behind the applicator apparatus. The spider gangs are adjustably mounted to the frame 12 as will hereinafter be described in detail. A compactor 24 is mounted to frame 12 rearwardly of the spider gangs for finally compressing rows.

Preferably frame 12 is comprised of a forward main frame 30 that supports a separate, floating subframe 32. The forward main frame is preferably comprised of a rigid, central stanchion 34 to which the blade 14 is attached and a pair of spaced apart flange assemblies 38. Each flange assembly 38 comprises a cooperating pair of angle iron flanges 37 secured to tool bar 40 with conventional U-bolts 42. Adjustable attachment (i.e., horizontally as viewed in FIG. 2) of implement 10 to a conventional tool bar 40 is accomplished by "U" bolts 42 and 42A. The center stanchion comprises an elongated slot 36 that slidably receives a U-bolt 42A (FIG. 2) to allow the height of the blade to be adjusted. When retainer nuts 39 are loose, stanchion 34, and thus blade 14 can be vertically adjusted.

The floating subframe 32 is comprised of a pair of identical, elongated, spaced apart sides 44, 45 that are generally parallel to one another and formed of angle iron. A transverse member 46 rigidly connects the two sides. A pair of generally triangular trusses 50 are secured to the subframe. Each truss 50 comprises a pair of similarly configured, spaced apart plates 50A and 50B. Elongated slots 48 and 49 are defined in the sides to adjustably mount the spider gangs. In the preferred embodiment, the floating subframe and the forward main frame are operatively joined by a parallelogram linkage comprising generally horizontally extending bars 51-54 which are normally parallel with frame sides 44 and 45. Upper linkage bars 51 and 52 are parallel with and spaced apart from lower linkage bars 53 and 54. The forward ends of the bars are pivotally secured to the forward main frame, being pivotally captivated between flanges 37 by bolts 55. The rear ends of linkage bars 51-54 are pivotally mounted to the floating subframe by bolts 56, which extend between truss plates 50A and 50B. The subframe can thus move upwardly and downwardly with respect to the main frame during operation.

The blade 14 is generally "V" shaped in plan and is comprised of upright sides 59, a cross member 59A and a forward projecting tongue 60. The upright sides 59 are made of steel plate meeting at a point near the forward end of the implement. The sides are rigidly joined by the cross member 59A that is formed of box tubing. The blade 14 is connected to the main frame 30 by "U" bolts 62. The "U" bolts 62 capture the cross member 59A passing through the lower end of the main frame stanchion 34 and are secured there by nuts 34A. Therefore, the blade 14 is rigidly mounted to the main frame 30. Due to the incorporative nature of the remaining elements of the implement the blade does not require an upper deflecting shield to prevent spillage over its top. Such spillage, while minimal, is simply incorporated by the vigorous action of the spider gangs 20 and 22.

The applicator 16 preferably comprises a conventional agri-chemical applicator 70 and/or a conventional seeder apparatus 72 (see FIG. 3). The agri-chemical applicator 70 generally applies pesticides, herbicides, fertilizer or the like across a predetermined band width. The dispensing end of the applicators are supported by a bracket 73 at a user determined height.

A tank mounted on the tow vehicle supplies the agri-chemicals by way of a conventional supply line 74. These agri-chemicals are dispensed on the soil after initial leveling by the blade 14 in the area designated by the numeral 13A in FIG. 3 in unison with the seeds supplied by the seeder apparatus 72.

The conventional seeder apparatus 72 dispenses seeds within the area designated by the numeral 13A in FIG. 3. The seeds to be distributed by the seeder apparatus 72 are preferably carried in a hopper 75 mounted to the upper bars of the parallelogram linkage 51 and 52.

The spider gangs 20 and 22 are structurally similar, and in the best mode, they structurally resemble mirror images of one another. The spider gang 22 is mounted to the floating subframe by a strut 80. Strut 80 is generally comprised of a channel iron body portion 82 that extends generally transversely across the floating subframe between sides 44 and 45 with the legs of the channel pointing downwardly. The strut body is adjustably bolted to the subframe sides 44 and 45 through slot 83 of the strut body and through slots 48 of the subframe sides 44 and 45. The strut further comprises downward extending flanges 84 that capture an axle by means of a bearing housing 88. The axle holds a plurality of the individual spiders 18. The bearing housings 88 at the lower extreme of each flange 84 provides a means by which the spiders on the axle may be freely driven by contact with the ground while the unit is being towed.

Spider gang 20, as pointed out above, is similarly constructed and is adjustably bolted to the subframe sides 44 and 45 through the slots 49 in the sides and the slots 83 in the strut body 82, in mirror image to gang 22. The major difference between the two gangs is that the tines of the spiders of each gang are pitched in opposite directions due to the mirror image mounting. For example the spider tine ends of the first gang 20 point to the right while those of the second gang 22 point to the left, or visa versa.

The preferred embodiment also utilizes curved, resilient scrapers 90 made of steel bar stock bolted to the rearward leg of the channel iron body 82 of the strut 80.

The scrapers generally extend downward between the individual spiders 18 and somewhat around the axle, thereby removing soil built up between the individual spiders 18 as they are ground driven.

The spider gangs are mounted to the subframe as mentioned above and are adjustable forward and rearward, independently at each end. This adjustability provides a means of creating an acute angle between the forward and rearward spider gangs as illustrated by FIGS. 2 and 2A. Also, the slots in the strut body 83 allow the gang to be adjusted side to side. Furthermore, this adjustability allows the spiders of each gangs to be fully or partially intermeshed as illustrated in the area designated by the numeral 21 of FIG. 2A. This intermeshing results in an unprecedented vigorous incorporation of the soil, moisture and the substance applied by the applicators 16. A final advantage of this wide range of adjustability is that the angles 201 and 202 established between each spider gang's common axis of rotation 210 and 220 and the lateral axis 205 of the implement can be maintained equal and opposite to one another. This allows the implement to tow straight without sacrificing the degree of incorporation obtainable. Vector forces tending to unbalance the machine are balanced and canceled when the spider gangs are similarly angled.

The compactor 24 comprises a rear frame 110 rigidly mounted to the elongated sides 44, 45 of the floating subframe 32, a wheel assembly 120 pivotally mounted to the rear frame 110 by bolt 112 and a spring assembly 140 biasing the wheel assembly downward.

The rigid rear frame is comprised of a cross member 111 and two sides 113. The cross member 111 is bolted to the floating subframe. The rear frame sides 113 extend at an angle downward and rearward from the ends of the cross member 111.

The wheel assembly 120 is comprised of a wheel frame 121, an axle 127 and a roller 135 preferably comprised of a plurality of tires 130. The wheel frame has a traverse member 124 and flanges 126 extending rearward from the ends of the transverse member. The wheel frame is pivotally bolted to the lower, rearward area of the rear frame sides 113 by bolt 112 through the wheel frame flanges 126. Two wheel halves 128 are mounted by means of an internal bearing assembly to axle 127. The wheel halves 128 are joined using through bolts 129 which pass through an internal cylindrical spacer. Mounted on the joined wheel halves 128 and the internal cylindrical spacer is a plurality of soil compacting tires 130. The axle 127 is held static between the wheel frame flanges 126 by jam nuts 131 and rotates within the internal bearing as the result of ground contact by the tires 130 while being towed.

The spring assembly 140 primarily comprises a spring 145, a spring bracket 147, a threaded rod 149, upper spring cap 150 and a lower spring cap 151. The spring bracket 147 is comprised of a pair of vertical steel plate sides and a steel plate base. The bracket 147 is secured to the rear frame cross member 111 by a conventional "U" bolt 148.

The lower spring cap 151 rests on the rearward ventral surface of the vertical sides of the spring bracket 147. The spring 145 is held in place by the lower spring cap 151. The upper spring cap 150 rests on the top of the spring 145. The threaded rod 149 passes through the upper cap 150, the spring 145 the lower cap 151, between the vertical sides of the spring bracket 147 and is pivotally connected to the traverse member 124 of the wheel frame. A nut 155 adjustably secures the threaded rod 149 where it extends above the spring cap.

Operation

The multi-function farm implement is attached to a tractor or other such vehicle generally using a tool bar 40 by means of the "U" bolts 42 and 42A of the forward main frame 30. Generally, many of the herein described units will be connected to a single tool bar to be used in conjunction with one another as illustrated by FIG. 5.

The blade 14 may be adjusted upward and downward relative to both the tractor and the floating subframe. To accomplish this one need only loosen the nuts 39 that secure the vertical stanchion 34 of the forward main frame at the slots 36. The blade is used to initially level the raised rows of a previously treated field.

The applicators 16 as mentioned above, can be used to apply an array of agri-chemicals such as fertilizers, pesticides or herbicides and seed if desired. Furthermore, the applicators can be adjusted to a desired height to establish the application width or band of the chemical or seed.

The spider gangs 20 and 22 incorporate the applied agri-chemicals and seed with the soil. The action and thereby the degree of incorporation can be adjusted by positioning the spider gangs' common axes of rotation 210 and 220 relative to the lateral axis 205 of the implement. One configuration allows the spider gangs' common axes of rotation 210 and 220 to be perpendicular to the longitudinal axis 200 of the implement. A second configuration allows the gangs 20 and 22 to be disposed at dissimilar angles to the lateral axis 205 of the implement. A third configuration allows the gangs 20 and 22 to be set at similar angles to the lateral axis 205 of the implement. Additionally, the first spider gang can be slid rearward or the second spider gang slid forward; or both may be slid toward each other to accomplish a partial or complete intermeshing of the spiders of the two gangs as illustrated by FIG. 2A. Furthermore, the slots in the body of the struts 83, provide means to slide the spider gangs from side to side to allow the individual spiders to mesh without interfering with one another. Straight towing of the implement necessitates maintaining equal angles between the common axis of rotation of each spider gang and the lateral axis of the implement 220 and 210.

The front spiders mirror the rear spiders so that they are better adapted to opposite angulation, thereby throwing the soil in opposite directions resulting in a more thorough mixing of the chemicals into the soil. In relatively dry soil conditions the spider gangs may be meshed together to facilitate self cleaning, to avoid the use of scrapers 90. In high moisture conditions scrapers disposed between the individual spiders 18 are required to prevent "balling up" of the soil. The softer the ground conditions the less the spider gangs need to be angled.

The compactor 24 is biased downwardly by means of the spring assembly 140. The magnitude of this downward pressure can be adjusted with nut 155. By screwing the nut downward the spring pressure of spring 145 against the spring cap 150 will be increased, thereby increasing the downward force on the threaded rod 149, transferring this force to the transverse member 124 of the wheel frame and into the ground contacting roller 135. The primary advantage of the compaction by the compactor is to seal the costly agri-chemicals and moisture in the freshly incorporated soil. Another advantage to this sealing includes activation of certain agri-chemicals. Also, this compacted soil provides a flat and firm surface for subsequent planting.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A multi-function, soil tilling farming implement comprising:
   (a) frame means for coupling said implement to a tool bar, said frame means having a front main frame and a rear, said frame means comprising a floating subframe suspended from said main frame and parallelogram linkage means for suspending said subframe from said main frame;
   (b) a longitudinal axis extending between said front main frame and said rear;
   (c) blade means depending downwardly from said frame means front main frame for initially contacting, shaping, and leveling a raised seed bed;
   (d) means for applying agri-chemicals to soil behind said blade means;
   (e) means for dispensing seeds behind said blade means;
   (f) spider means secured to said frame means floating subframe behind said applicator means for vigorously incorporating and blending agri-chemical, seeds and soil, said spider means comprising:
      a first gang of rotatable spiders disposed in a row beneath said frame means and establishing a first common axis of rotation at a first angle generally perpendicular to said longitudinal axis;
      a second gang of rotatable spiders disposed in a row beneath said frame means and establishing a second common axis of rotation at a second angle generally perpendicular to said longitudinal axis;
      means for selectively varying said first and second angles;
   (g) wherein said subframe comprises a pair of rigid, elongated, spaced apart sides generally parallel with said longitudinal axis, each side comprising forward and rear elongated, spaced apart mounting slots;
   (h) said first and second gangs comprising elongated, rigid struts extending generally angularly between said subframe sides, each strut comprising a body portion, a pair of downwardly projecting flanges, an axle captivating the spiders and journaling them for rotation between said strut flanges, said struts further comprising elongated mounting slots adapted to register with said first mentioned mounting slots, whereby the position of said gangs can be varied; and,
   (i) roller means for compacting soil, said roller means yieldably biased downwardly from said frame means behind said spider means into soil contact.

2. The farming implement as defined in claim 1 wherein said first and second spider gangs are at least partially meshed with one another.

3. The farming implement as defined in claim 2 wherein the tines of said spiders of the second gang are pitched at a dissimilar angle to the tines of said spiders of the first gang.

4. The farming implement as defined in claim 2 further comprising resilient scraper means for cleaning said spider gangs, said scraper means projecting generally downwardly from said strut means between individual spiders.

5. The farming implement as defined in claim 2 wherein said position of said first and second spider gangs can be varied forwardly, rearwardly or generally perpendicularly to said longitudinal axis independently at each end of said struts.

6. The farming implement as defined in claim 2 wherein said blade means is vertically adjustable.

7. A soil planting, tilling, and agri-chemical applicating farming implement comprising:
(a) frame means for coupling said implement to a tow vehicle, said frame means comprising a longitudinal axis extending between a front and rear and a pair of rigid, elongated, spacer apart sides extending toward said frame means rear;
(b) adjustable blade means depending downwardly from said implement for initially contacting, shaping, and leveling a raised bed;
(c) means for applying agri-chemicals to soil behind said blade means;
(d) planting means for seeding soil behind said blade means;
(e) spider means secured to said frame means for vigorously mixing and incorporating agri-chemical, seed, and soil, said spider means comprising:
a first gang of rotatable spiders disposed in a row beneath said frame means and journaled for rotation about a first common axis of rotation;
a second gang of rotatable spiders disposed in a row beneath said frame means and journaled for rotation about a second common axis of rotation;
said first and second axes of rotation forming equal and opposite acute angles relative to said longitudinal axis, said second gang at least partially meshed with said first gang;
(f) said spaced apart frame sides being generally parallel with said longitudinal axis, each side comprising forward and rear elongated, spaced apart mounting slots;
(g) said first and second gangs further comprising elongated, rigid struts extending generally transversely between said frame sides, each strut comprising a body portion, a pair of downwardly projecting flanges, an axle captivating the spiders journaled for rotation between said strut flanges, said struts further comprising elongated mounting slots adapted to register with said first mentioned mounting slots, whereby said acute angles formed between said first and second common axes of rotation may be varied; and,
(h) roller means for compacting soil, said roller means yieldably biased downwardly from said frame means behind said spider means into soil contact.

8. The farming implement as defined in claim 7 wherein the tines of said spiders of the second gang are pitched at a dissimilar angle to the tines of said spiders of the first gang.

9. The farming implement as defined in claim 7 further comprising resilient scraper means for cleaning said spider gangs, said scraper means projecting generally downwardly from said strut means between individual spiders.

10. A soil tilling implement comprising:
(a) frame means for mounting said implement to a tool bar, said frame means comprising a front, a rear, a floating subframe suspended from said front, and linkage means for suspending said subframe from said frame means, said subframe comprising a pair of rigid, elongated, spaced apart parallel sides, each side comprising forwardly and rearwardly disposed elongated, spaced apart mounting slots;
(b) vertically adjustable blade means depending downwardly from said frame means for initially contacting, shaping, and leveling a previously established raised seed bed;
(c) applicator means supported by said frame means rearwardly of said blade means for applying agri-chemical to the soil;
(d) spider means secured to said frame means behind said blade means for vigorously incorporating and blending soil and agri-chemical, said spider means comprising:
a first gang of rotatable spiders disposed in a row beneath said frame means and establishing a first common axis of rotation;
a second gang of rotatable spiders disposed in a row beneath said frame means and establishing a second common axis of rotation;
strut means for mounting said first and second gangs to said frame means at a variable, user selected distance from said blade means, such that said first common axis and said second common axis of rotation may be variably angled, said strut means comprising elongated, rigid struts extending generally transversely between said subframe sides, each strut comprising a body portion, a pair of projecting flanges, an axle captivating the spiders journaled for rotation between said strut flanges, and said struts further comprising elongated mounting slots adapted to register with said first mentioned mounting slots, whereby the position of said gangs can be varied;
(e) resilient scraper means for cleaning said spiders; and,
(f) roller means for compacting soil, said roller means yieldably biased downwardly from said frame means rear into soil contact.

11. The tilling implement of claim 10 wherein said first and second spider gangs are at least partially meshed with one another.

12. The tilling implement of claim 10 wherein tines of said spiders of the second gang are pitched at a dissimilar angle to the tines of said spiders of the first gang.

13. The tilling implement of claim 12 wherein said first and second spider gangs are at least partially meshed with one another.

14. A soil tilling implement comprising:
(a) frame means for mounting said implement to a tool bar, said frame means comprising a front, a rear, a floating subframe suspended from said front, and linkage means for suspending said subframe from said frame means, said subframe comprising a pair of rigid, elongated, spaced apart parallel sides, each side comprising forwardly and rearwardly disposed elongated, spaced apart mounting slots;

(b) vertically adjustable blade means depending downwardly from said frame means for initially contacting, shaping, and leveling a previously established raised seed bed;

(c) seeding means supported by said frame means rearwardly of said blade means for introducing seeds into the soil;

(d) spider means secured to said frame means behind said blade means for vigorously incorporating and blending soil and seeds, said spider means comprising:

a first gang of rotatable spiders disposed in a row beneath said frame means and establishing a first common axis of rotation;

a second gang of rotatable spiders disposed in a row beneath said frame means and establishing a second common axis of rotation;

strut means for mounting said first and second gangs to said frame means at a variable, user selected distance from said blade means, such that said first common axis and said second common axis of rotation may be variably angled, said strut means comprising elongated, rigid struts extending generally transversely between said subframe sides, each strut comprising a body portion, a pair of projecting flanges, an axle captivating the spiders journaled for rotation between said strut flanges, and said struts further comprising elongated mounting slots adapted to register with said first mentioned mounting slots, whereby the position of said gangs can be varied;

(e) resilient scraper means for cleaning said spiders; and, (f) roller means for compacting soil, said roller means yieldably biased downwardly from said frame means rear into soil contact.

15. The tilling implement of claim 14 wherein said first and second spider gangs are at least partially meshed with one another.

16. The tilling implement of claim 14 wherein tines of said spiders of the second gang are pitched at a dissimilar angle to the tines of said spiders of the first gang.

17. The tilling implement of claim 16 wherein said first and second spider gangs are at least partially meshed with one another.

* * * * *